2,676,156

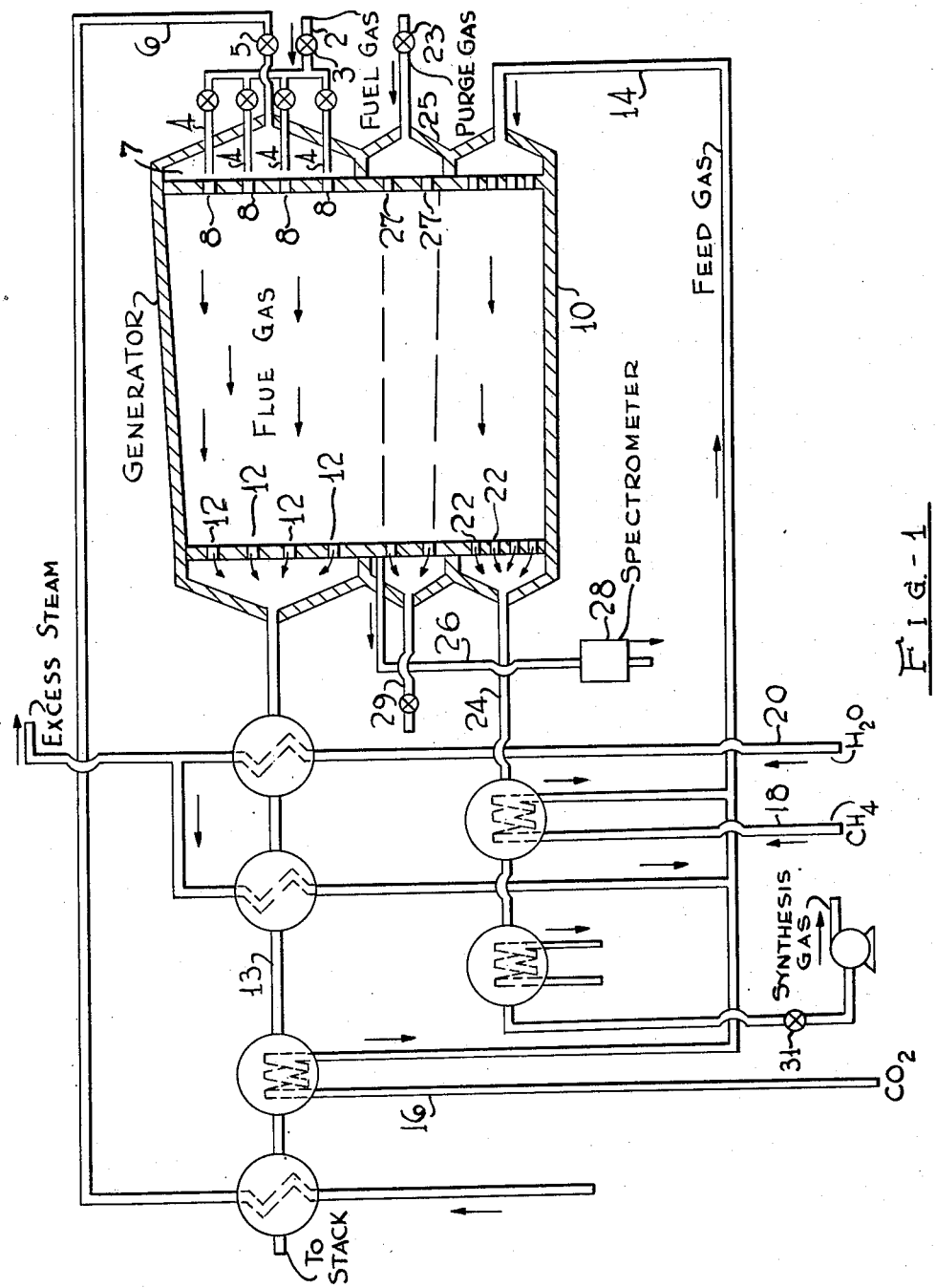

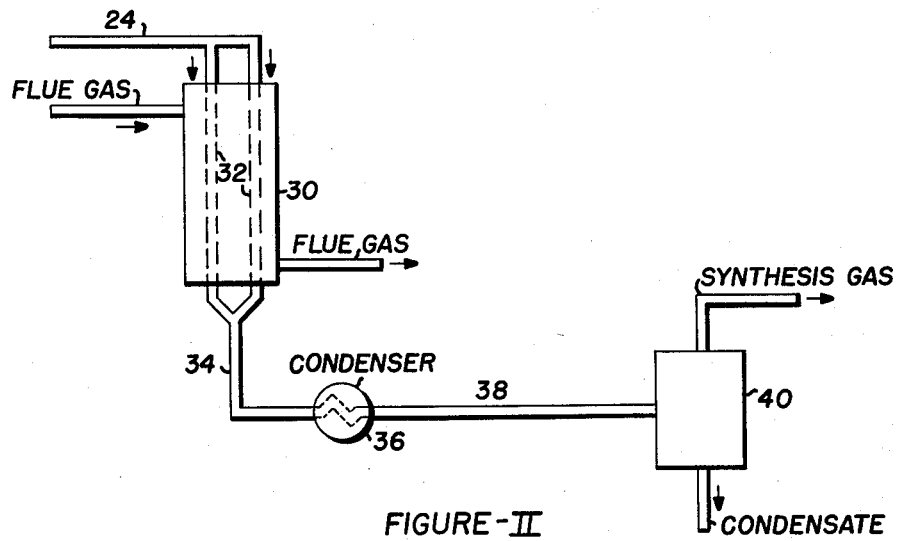
FIGURE-II
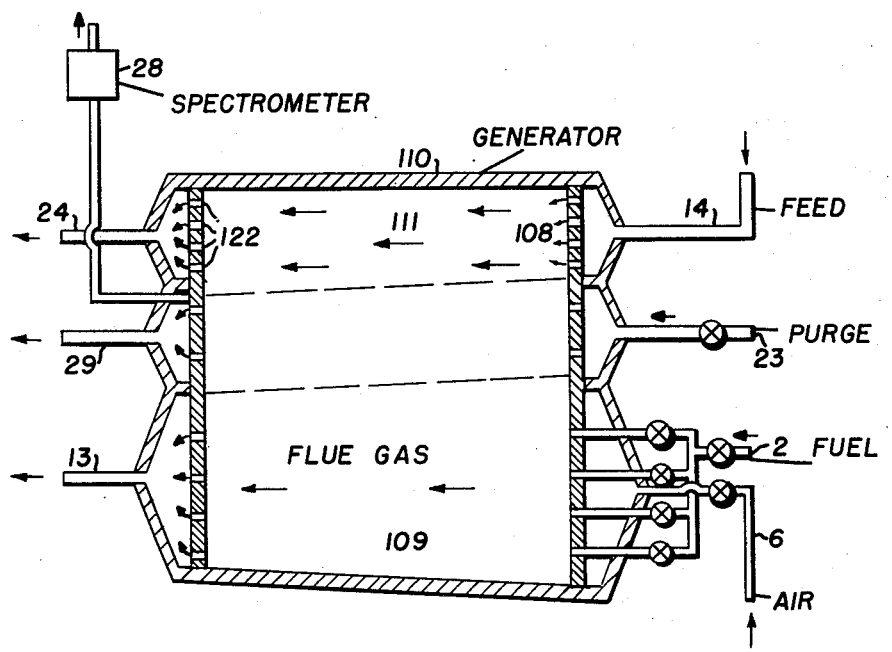
FIGURE-III
Bradford E. Bailey   Inventor
By J. Cashman   Attorney Patented Apr. 20, 1954

UNITED STATES PATENT OFFICE 2,676,156

PREPARATION OF SYNTHESIS GAS

Bradford E. Bailey, Elizabeth, N. J., assignor to Standard Oil Development Company, a corporation of Delaware Application May 19, 1950, Serial No. 163,057

10 Claims. (Cl. 252—373)

The present invention relates to the preparation of a gas comprising carbon monoxide and hydrogen. It is more particularly concerned with the production of these gases by reforming a light hydrocarbon feed gas and is particularly directed to a simplified and highly advantageous process for furnishing heat for the endothermic reforming reaction. In accordance with the present invention, carbon dioxide, steam and a light hydrocarbon gas such as methane or natural gas is subjected to the action of radiant heat to produce carbon monoxide and hydrogen in proportions suitable for employment in the hydrocarbon synthesis process. The methane reforming reaction may be indicated as follows:

1. $CH_4 + H_2O \rightleftharpoons 3H_2 + CO$
2. $CH_4 + CO_2 \rightleftharpoons 2H_2 + 2CO$ By manipulation of the quantities of $CH_4$, $H_2O$ and $CO_2$ to be reacted, desired ratios of $H_2$ to $CO$ in the product may be obtained. Thus, to produce a synthesis gas having an $H_2$ to $CO$ ratio of 2:1, proportions would be 3. $3CH_4 + 2H_2O + CO_2 \rightleftharpoons 8H_2 + 4CO$ The synthesis of hydrocarbons having 4 and more carbon atoms in the molecule from carbon monoxide and hydrogen in the presence of suitable catalysts is a matter of record. The ratio of these components varies somewhat between 1 to 2 volumes of hydrogen per volume of carbon monoxide.

These feed gases may be prepared in a number of ways such as by the water gas reaction to give a 1:1 gas and by the controlled oxidation of natural gas or methane with oxygen or with metal oxides to give synthesis gas having a higher ratio of hydrogen to carbon monoxide. One of the most effective methods and most flexible for obtaining synthesis gas of desired $H_2$ to $CO$ ratios is to reform methane or natural gas which contains about 95% methane either non-catalytically at high temperatures or with a catalyst comprising a metal of group VIII of the periodic system. Reforming is, as indicated, a partial oxidation of methane by steam or carbon dioxide or a mixture of these gases to form primarily carbon monoxide and hydrogen. The reaction is generally conducted by passing methane and steam and/or carbon dioxide over a catalyst such as nickel or iron either alone or supported on carriers such as kaolin or kieselguhr at a temperature in the range of about 1500° to 2000° F. and pressures from about 1 to 20 atmospheres.

Heretofore and prior to the present invention, it has been the practice to supply heat to the highly endothermic reformation reaction involving methane, steam, and carbon dioxide, indirectly by means of tubular furnaces, the tubes of which surround the long and narrow reaction chamber which is usually in the form of a vertical column. A tubular furnace employed for this type of service requires a large number of costly alloy tubes since heat transfer rates for heating gases in tubes are very low. Thus, a typical furnace may consist of vertical tubes filled with catalyst, which tubes are of heat-resisting chrome nickel alloy to withstand the 1600° F. or so internal operating temperatures.

Other techniques that have been developed for the commercial utilization of the reforming reaction involve regenerative furnaces, or reaction chambers involving direct oxidation with pure oxygen. The regenerating furnace will permit operation non-catalytically at very high temperatures. Also suggested has been a catalytic and non-catalytic fluid solids type of process wherein the reforming gases are contacted with the dense fluidized mass of a heat carrier or catalyst.

Each of the above enumerated processes for reforming gas is accompanied by certain distinct disadvantages. Thus, catalytic processes in general, require regeneration of the catalyst to remove coke while fluid processes require regeneration as well as extraneous equipment for recovering catalyst as well as replacement for catalyst losses. The employment of tubular type of reformers wherein the tubes contain catalyst is accompanied by the following disadvantages:

(1) The tubes must be of the expensive temperature resistant alloy such as 25% chrome, 20% nickel alloy steel to withstand the required minimum 1600° F. inside tube operating temperature over long periods of time.

(2) A large amount of tubular surface is required. Thus, it has been found that 350,000 B. t. u. per hour is as much heat as can be absorbed by a 6" x 24' tube at an internal gas temperature of 1500° F., and on this basis the heat density through the wall is only about 10,000 B. t. u. per hour per square foot. Furthermore, the temperature of the catalyst in the center of the tube is considerably less than the temperature near the walls of the tube resulting in uneven reformer conditions and impairment of the efficiency of the catalyst exposed to the high tube wall temperature. Also, the heat density through the side of the tube facing the fire box or flame is considerably higher than the opposite side of the tube, while passing the gas through tubes filled with solid catalyst leads to excessive gas pressure drops.

One of the serious disadvantages in operating in accordance with the tube reforming process at pressures in the order of 20 atmospheres is the fact that the high cost metal alloy does not permit employment of the high temperatures above about 2000° F. which favor the endothermic reforming process and result in high yield of synthesis gas. Previous regenerative furnace processes operating at high temperatures have been accompanied by difficulties in coke deposition, and in the cyclic reversing arrangement used in supplying heat to the system.

It is the purpose of the present invention to disclose the method of furnishing heat to the reforming process whereby high yields of synthesis gas may be obtained without employment of tubular furnaces, regenerative furnaces, or essentially pure oxygen.

It is also a purpose of the present invention to utilize the radiant energy emitted by the combustion of fuel gas to furnish the heat required for the endothermic reforming process.

Other purposes and advantages of the present invention will become apparent from the more detailed disclosure below.

In accordance with the present invention, tubular furnaces are dispensed with in the gas reformation process and are replaced by a novel, simple and highly advantageous method of heat supply by the application of radiant heating. Though the application of radiant heating to processes of petroleum has been hitherto described, the present application to the reformation reaction is based upon the transfer of radiant energy not to liquid or solid hydrocarbon molecules, but to the gaseous molecules which, in the process of the present invention, are peculiarly adapted to receive the radiant energy.

In brief compass, in accordance with the present invention, a mixture of $CO_2$, $CH_4$ and steam is passed into a furnace, preferably horizontally, and in its passage through that furnace, is exposed to direct radiation from a preferably concurrent flue gas stream flowing essentially parallel. The flue gas resulting from combustion of carbonaceous fuel such as natural gas, contains $CO_2$ and water vapor and, therefore, a very large portion of the radiant heat waves from the burners is characteristic of the vibrations within these molecules.

The gases involved in the production of synthesis gas from natural gas, namely, $CO_2$, $CO$, $H_2O$ and $CH_4$ all have particularly strong abilities to absorb infra red radiation of the wave lengths encountered in high temperature furnaces. These gases are heteropolar gases and absorb infra red radiation strongly, while other gases with symmetrical molecules such as $N_2$, $O_2$ and $H_2$ do not absorb as strongly. The absorption of radiant heat by $CO_2$ and $H_2O$ in the feed gas is a direct function of the emissivity of radiant heat from the $CO_2$ and the $H_2O$ molecules and the hot gas. In other words, the flue gas and the feed gas act substantially as black bodies to one another, especially when employed in sufficiently thick gas layers and in sufficient concentrations. Thicknesses of feed gas of from 10 to 20 feet, product gas of 10 to 20 feet and flue gas of 20 to 50 feet are preferred.

One of the advantages of employing the radiant heat technique in accordance with the present invention is that the heat absorbing gases can be permitted to reach high temperatures in order to promote complete reaction and still very high heat transfer rates be secured. Thus for example, a radiating refractory temperature of 2800° F. and a synthesis gas temperature leaving the furnace of 2000° F. results in a radiant heat transfer rate of 91,000 B. t. u. per hour per square foot plane surface. If the absorbing gases were at 2400° F. and the radiating body remained at 2800° F., the rate would be 55,000 B. t. u. per hour per square foot. Furthermore, if the radiation surface were at a temperature of 3000° F., the heat transfer rate to an absorption gas at 2400° F. is again 91,000 B. t. u. As indicated, the above shows that the temperatures of the heat absorbing gases may be easily maintained at high levels without appreciable sacrifice in heat transfer rates. The reason for this is that heat transfer rates in radiant heat transfer are proportional to the difference between the absolute temperature of the radiating medium raised to the fourth power and the absolute temperature of the absorbing medium raised to the fourth power; while for conduction, heat transfer rates are proportional simply to the difference between the temperature of the radiating medium and the temperature of the absorbing medium. In fact, even when the temperature of the absorbing gases is as little as 200° F. below the temperature of radiating surfaces, heat transfer rates above 30,000 B. t. u. per hour per square foot are obtained in high temperature level furnaces. These high heat transfer rates are substantially above those obtainable in tube reformers. Thus, summarizing, radiant heating of the gases involved and thermal reforming of methane with $CO_2$ and $H_2O$ is particularly effective because these gases and $CO$ are particularly strong absorbers of infra red radiation of wave lengths incurred in furnaces and the radiation is emitted by the $CO_2$ and $H_2O$ molecules in the flue gas which produces most of the radiation in almost exactly the same wave lengths which are absorbed by the $CO_2$ and $H_2O$ molecules of the feed gas.

The process of the present invention may be readily understood by referring to the accompanying drawings illustrating preferred modifications of the present invention.

Figure I discloses a process wherein all the reforming is carried out at high temperatures under non-catalytic conditions, Figure II discloses a modification wherein any unconverted feed gases are substantially completely converted in a catalytic type of reforming process and Figure III discloses a modification of Figure I wherein a slightly different arrangement of the gas streams in the furnace is provided to accomplish the same result.

Referring now in detail to Figure I, this illustrates the method of utilizing radiant heat to supply the necessary endothermic heat of reaction in the thermal or non-catalytic reforming of methane with $H_2O$ and $CO_2$. Reactor 10 is preferably a box type of furnace wherein natural gas fuel is fired at the top front side through lines 2 and 4. Air for combustion purposes preheated by heat exchange with flue gas to about say 1200° F. is introduced through line 6 into compartment 7, and through air ports 8. Combustion takes place in 10, which may be at a temperature as high as 4000° F. and the flue gas passes across the top of the furnace 10 and discharges through suitable ports 12 and line 13 at the top rear side of furnace 10. The fuel gas and the compressed air are both controlled at constant rates by means of valves 3 and 5, respectively, and the volume of flue gas so produced is constant for any particular temperature of the flue gas. The heat generated within the reactor may also be controlled by controlling the ratio of fuel gas to air. In general, it is desirable to employ preheated combustion air so as to maintain the temperature of the flue gas at high temperatures, in the range of 3500° to 4000° F. to facilitate efficient heat transfer. At the high temperatures of operation, when an excess of steam is employed with the feed gases, any carbon black precipitated in the open reaction zone absorbs radiation extremely fast, promoting its reaction with steam.

Feed gas preheated to about 1200° to 1400° F. by heat exchange with exit gas is passed into furnace 10 through line 14. The feed gas consists essentially of $CO_2$ introduced through line 16, natural gas introduced through line 18, and steam introduced through line 20. The feed gas constituents may be present in any proportions to produce synthesis gas having carbon monoxide to hydrogen in any desired ratio. To produce a synthesis gas having a 2:1 ratio of $H_2$ to CO, the proportions of the feed gas are in the ratio of 3 mols of methane to 2.4 mols of water to 1 mol of $CO_2$. A volume of 2.4 mols of water is used to facilitate the completion of the reaction and to avoid deposition of carbon black. The excess water is readily removed from the synthesis gas formed by subsequent condensation. The preheated feed gas is passed to reactor 10 through line 14 and as a result of the radiation from the flue gas stream above, it is heated to a temperature of about 2600° F. The feed and product gas passes along the floor of the furnace and is withdrawn in the opposite side of the furnace through ports 22 and line 24. The resulting synthesis gas is passed in heat exchange relation with incoming feed gas and excess heat may be extracted in making steam.

Within the furnace the feed gas comprising $CO_2$, $H_2O$ and $CH_4$ is exposed to flue gases at approximately 2800° F. to 4000° F. resulting in an average radiant heat transfer rate of 46,000 B. t. u. per hour per square foot floor area. The feed gas temperature rises rapidly since only sensible heat is required initially. When a temperature in the order of 1800° to 2000° F. is reached in the feed gas, the rate of reforming becomes appreciable and the temperature holds at about that level. As the rate of reforming decreases toward completion of the reaction, the temperature increases in the order of 2600° F. This final high temperature shifts the equilibrium so as to produce substantially complete conversion of $CH_4$.

To prevent apprecible intermixing of lower feed gas and product gas with the upper flue gas, the linear velocities of the two gas streams throughout the reactor are maintained substantially equal, particularly at the outlet side of the reactor. The velocities of the gas streams through the reactor may be in the order of 5 to 15 feet per second. In a preferred operation, the residence time of the feed gas in the reformer is about 10 seconds. The excess steam is about 20% and the pressure is about 0 p. s. i. g. and the temperature of the synthesis gas leaving the furnace in the order of about 2400° to 2600° F. The excess of steam is useful to prevent the deposition of carbon as well as to facilitate the absorption of radiant heat by the reformed gases when the reaction is near completion.

In order to decrease intermixing of the flue gas and the synthesis gas, the exit and inlet port openings may be adjusted by suitable dampers whereby velocities of the two layers may be held substantially equal. In order to adjust the rates of synthesis gas withdrawal, a sample of the gas substantially above the synthesis gas outlet ports may be withdrawn through line 26 and passed through an analytical device such as mass spectrometer 28 wherein the hydrogen concentration may be determined. In accordance with the hydrogen concentration in the gas layer, the rate of synthesis gas withdrawal may be controlled through control valve 31. Thus, if the synthesis gas layer rises above the prescribed sample draw-off level, its rate of removal is increased, in response to its concentration in the layer above the synthesis gas withdrawal port.

Purge gas may be introduced through line 23, compartment 25, and adjustable ports 27 into chamber 10 between the lower layer of feed gas and the upper layer of flue gas. This purge gas is helpful in preventing intermixing of the feed gas and flue gas. It may be discharged through line 29 or burned at least in part, and discharged with the flue gas. A purge gas consisting largely of hydrogen, such as tail gas, is particularly adaptable as tail gas intermixing with the product gas is not objectionable and hydrogen is transparent to the radiant heat. It may also be advantageous when passing the synthesis gas or the gas to be reformed along the upper portion of the reaction chamber to construct the roof of polished stainless steel instead of fire brick in order to reflect infra red radiation passing through the gas back through the gas. This stainless steel would be only lightly insulated to hold its temperature below about 1000° to 1500° F. These radiations will be reflected radiations and not re-radiated radiation and will, therefore, be more intense and characteristic of the original temperature levels.

Though the reformer is preferably operated at atmospheric pressures or slightly below since increasing pressure reduces methane conversion, the equilibrium reformer oven 10 may, if desired, be operated at elevated pressures up to 400 pounds or more, which pressures are more suitable for the hydrocarbon synthesis reaction. Under those conditions, the temperatures obtaining in the reformer are of the same order of magnitude as those obtaining when a catalytic rather than a non-catalytic process is employed for it has previously been the practice to reform catalytically at elevated pressures in the temperature range of 2000° to 2200° F. When elevated pressures are employed it may be desirable to employ a cylindrical shape reaction vessel instead of the box type which is more suitable for operating at atmospheric pressures. At elevated pressures the thicknesses of the respective gas layers will be decreased if velocities are not decreased, but the partial pressures of the radiant heat absorbing constituents, i. e. $CO_2$ and $H_2O$ will not change due to the increased total pressure.

Under certain circumstances, it may be desirable to operate at less than complete conversion in the reformer and to complete the conversion in a subsequent catalytic reforming vessel. Thus, as shown in Figure II, exit gases from the thermal reformer are passed through line 24 to catalytic reformer 30. The latter may comprise a plurality of elongated tubes 32 of relatively narrow design enclosed in a jacket. The temperature of the incoming gas stream, approximately 2000° F., supplies substantially all of the heat required for the endothermic catalytic process, though smaller amounts of additional heat may be furnished to reformer 30 if desired, to prevent substantial temperature drops throughout the reactor and prevent carbon deposition. Thus, to maintain the temperature within the conversion zone within the range of about 1600° to 1800° F., smaller amounts of heat may be supplied by passage of the hot flue gases from reactor 10 through the jacket.

Tubes 32 may be filled with a pelleted catalyst conducive to the conversion of methane. A good conversion catalyst is one containing about 20% nickel supported on a mixture of alumina and kaolin. The operation of the reformer and the material of the catalyst do not go to the heart of the invention. Previously, unconverted steam, carbon dioxide and methane, in addition to the carbon monoxide and hydrogen previously formed heated to a temperature level of about 1800° to 2000° F. are passed through the reforming tubes. The reformed product after desired time of contact, is withdrawn from reformer 30 through line 34 and is handled in any way desired. Thus, product gas having any desired $H_2$ to CO ratio is withdrawn from the bottom of tubes 32 and passed to condenser 36 wherein condensible constitutents, mainly excess steam, are condensed. Gas and condensate pass through line 38 to gas-liquid separator 40. Product gas is withdrawn overhead from separator 40 through line 42 and the gas may be subjected to any conventional means for removing $CO_2$ if desired, as by caustic scrubbing in conventional apparatus not shown. The make-gas is then ready for use in the synthesis operation or for any other desired purpose.

In the foregoing, the gas to be reformed and the resulting synthesis gas is passed along the lower section of the reactor and the flue gas along the upper portion of the reactor. However, if desired, the synthesis gas may be passed across the roof and the combustion gas across the floor. This modification is shown in Figure III, which includes a partial showing of the apparatus arranged as in Figure I, in which similar parts are similarly numbered. Thus the feed gas introduced through line 14 enters the top of furnace 110 through inlet posts 108, passing across in the horizontal layer 111 to exit ports 122 and thence to the product recovery line 24. Fuel gas introduced through line 2 and preheated air introduced through line 6 react to form a flue gas layer 109, at the bottom of generator 110. Spent combustion gases are vented through line 13. As in Figure I, purge gas introduced through line 23 and withdrawn through line 29 separates the flue gas layer 109 from the feed gas undergoing reaction in layer 111. This arrangement has the advantage that at the outlets of the furnace this puts the heavier gas below the lighter gas which further helps to prevent intermixing. For example, the gases have the following weights per 100 cubic feet at a pressure of 1 atmosphere.

|  | Lb./100 cu. ft. |
|---|---|
| Combustion gas entering at 4000° F | 0.92 |
| Combustion gas leaving at 2800° F | 1.27 |
| Feed gas entering at 1400° F | 1.56 |
| Synthesis gas leaving at 2400° F | 0.51 |

The system illustrated by the drawings permits of many modifications obvious to those skilled in the art without deviating from the spirit of the invention which is to transmit heat by radiant energy to gases in the reforming of methane. Thus, it may be desirable, under certain circumstances, to pass the combustion gas and the synthesis gas countercurrently through the reactor in order to obtain larger temperature differentials for heat exchange. This would have the disadvantage, however, that considerably more intermixing of the gas layers would be sustained.

The foregoing description and exemplary operations have served to illustrate specific embodiments and applications of the present invention and are not intended to be limiting in any way.

What is claimed is:

1. The process of preparing a hydrocarbon synthesis gas consisting essentially of hydrogen and carbon monoxide which comprises feeding into a gas inlet zone at one end of a methane reforming zone, a gas stream comprising a thick layer of the order of at least 10 feet of methane, $CO_2$ and $H_2O$, feeding a fuel gas and a combustion-supporting gas to a combustion zone spaced vertically from said gas inlet zone, carrying out a combustion reaction wherein a flue gas comprising substantial amounts of $CO_2$ and $H_2O$ is produced, maintaining the temperature of said combustion zone at about 2800° to 4000° F., passing said flue gas as a thick layer of at least 10 feet, moving horizontally and concurrently with the thick layer of said first-named gas stream through said reaction zone, carrying out a methane reforming reaction in said zone, furnishing substantially all the heat required for said reforming reaction as radiant energy from said flue gas, absorbing substantially all of said radiant energy in said thick layer of said gas undergoing reforming whereby said thick layer acts substantially as a black body for said absorption, and separately withdrawing flue gas and a gas mixture comprising synthesis gas at the opposite end of said reaction zone from said gas inlet zone.

2. The process of claim 1 wherein said fuel gas and combustion-supporting gas are admitted to said combustion zone at a point spaced above the gas inlet zone for said first-named gas mixture.

3. The process of claim 1 wherein said fuel gas and combustion-supporting gas are admitted to said combustion zone at a point spaced below the inlet zone for said first-named gas mixture.

4. The process of claim 1 wherein said gas mixture comprising synthesis gas is withdrawn from said reforming zone and passed to a catalytic reforming zone for the further partial oxidation of methane to hydrogen and carbon monoxide in the presence of steam and $CO_2$.

5. The process of claim 4 wherein said withdrawn gas is contacted in said catalytic reforming zone with a methane reforming catalyst for said reaction selected from group VIII of the periodic system.

6. The process of claim 1 wherein the pressure in said reforming zone is in the range of 0 to 400 p. s. i. g.

7. The process of claim 1 wherein said methane, $H_2O$ and $CO_2$ are added to said reforming zone in the ratio of about 3 mols $CH_4$ to 2.4 mols $H_2O$ to 1.0 mol $CO_2$.

8. The process of claim 1 wherein a purge gas is introduced into said reaction zone intermediate said fuel gas and said first-named gas stream.

9. The process of claim 1 wherein said flue gas and said first-named gas stream are passed through said reaction zone at substantially equal velocities.

10. The process of claim 1 wherein the rate of synthesis gas withdrawal is separately controlled, an analytical device responsive to the hydrogen content of the reactant gas and flue gases provides an index of the thickness of the product synthesis gas layer within the reforming zone, and said rate of synthesis gas withdrawal is controlled according to said indicated hydrogen content to maintain the desired thickness of the synthesis gas layer at the outlet of said reforming zone.

References Cited in the file of this patent

UNITED STATES PATENTS

| Number | Name | Date |
|---|---|---|
| 1,892,559 | Hillhouse | Dec. 27, 1932 |
| 2,011,339 | Hillhouse | Aug. 13, 1935 |
| 2,028,326 | Hanks et al. | Jan. 21, 1936 |
| 2,047,870 | Hillhouse | July 14, 1936 |
| 2,355,753 | Roberts, Jr. | Aug. 15, 1944 |